R. M. ROBINSON.
ANCHOR.
No. 180,374.  Patented July 25, 1876.
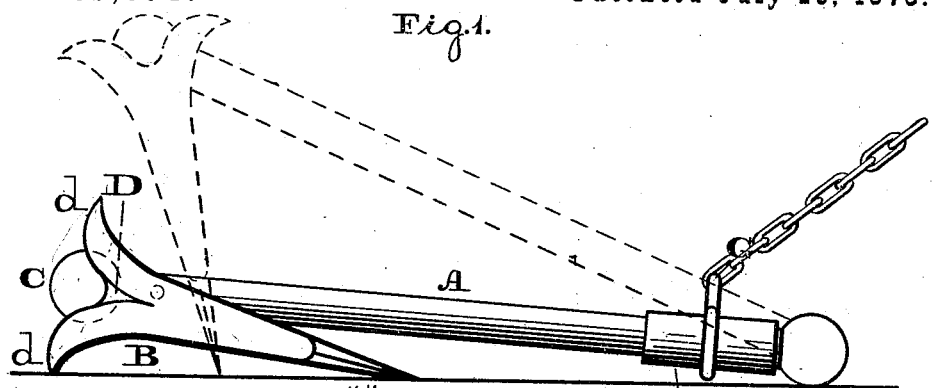
Fig. 1.
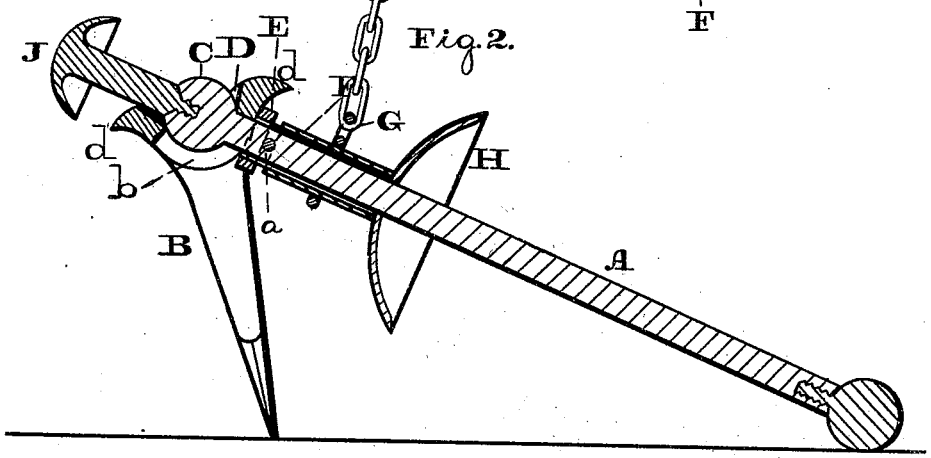
Fig. 2.
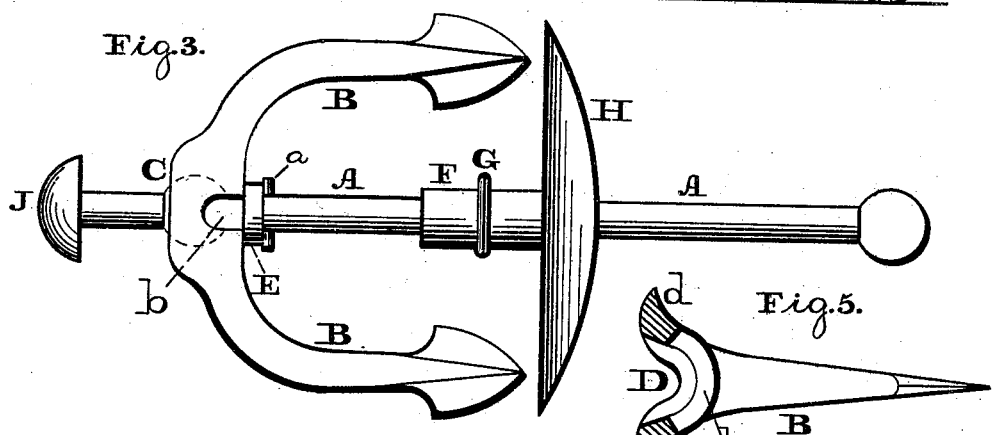
Fig. 3.
Fig. 4.
Fig. 5.
Witnesses:
Lewis F. Brous,
A. P. Grant.
Inventor:
R. Wiley Robinson.
by
John A. Wiedersheim
Attorney.

UNITED STATES PATENT OFFICE.

R. MILES ROBINSON, OF PHILADELPHIA, PENNSYLVANIA.

IMPROVEMENT IN ANCHORS.

Specification forming part of Letters Patent No. 180,374, dated July 25, 1876; application filed June 1, 1876.

*To all whom it may concern:*

Be it known that I, R. MILES ROBINSON, of the city and county of Philadelphia and State of Pennsylvania, have invented a new and useful Improvement in Anchors; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1 is a side elevation of the anchor embodying my invention. Fig. 2 is a longitudinal section in line $x\ x$, Fig. 3. Fig. 3 is a plan view. Fig. 4 is a detailed view of the fluke-arms; Fig. 5 is a view, similar to Fig. 2, of the fluke-arms detached from the shank.

Similar letters of reference indicate corresponding parts in the several figures.

My invention consists in connecting the fluke-arms and shank by a ball-and-socket joint. It also consists in a sliding and self-adjusting shank through the socket-joint slot or opening. It also consists in forming the fluke-arms with a groove for the head of the shank and an opening for the passage and play of the shank. It also consists of the combination, with the pivoted fluke-arms, of a mushroom-head. It also consists of mechanism for retaining the head in the socket. It also consists of a sliding connection between the anchor and the chain thereof. It also consists in a stop for the sliding connection. It also consists of a scoop, located in advance of the fluke-arms.

Referring to the drawings, A represents the shank, and B the fluke-arms. On the shank I form a ball-head, C, which enters a cavity or socket, D, on the rear or outer face of the crown or the fluke-arms, thus connecting the shank and fluke-arms by a ball-and-socket joint. If desirable, to prevent displacement of the head from the socket D, I secure to the shank, adjacent to the inner face of the crown of the fluke-arms, a collar or clevis, E, or a screw may be fitted to the crown of the fluke-arms, and have either its head or point bear against the ball-head, and thus provision is made for holding the head in the socket, when necessary. To the rear or bottom end of the shank there is connected a rod, or an extension of the shank is made, on which extension, at its extremity, is secured a mushroom-head, J, which, when the anchor is being dragged, is adapted to take hold at the bottom of the water, and thus elevate the shank A and place the palms of the flukes in engaging position. On the shank A there is fitted a sliding sleeve, F, to which is connected an eye or loop, for attachment of the chain of the anchor, and whose inner motion is limited by a stop, $a$. H represents a scoop, which is fitted on the shank A, and located in advance of the fluke-arms.

The fluke-arms and crown are constructed in one piece, of a bar of iron or other suitable material. The bar being first upset in the middle, the two ends are bent in the shape of a horseshoe. The bent ends or arms are then flattened laterally, and the crown portion thereof flattened longitudinally, and its circumferential edges bent or inclined forward, toward the ends of the flukes, so as to form lips $d$, leaving a transverse socket cavity or groove, D, for the reception of the connecting-head of the shank. An opening, $b$, is made in the crown, at right angles to the socket-groove D, so as to admit of the passage and play of the shank of the anchor.

The fluke-arms and palms with flat continuous faces are so constructed in order to prevent any fouling of the chain around the said arms and flukes, and at the same time increase the holding-surface.

The loose, free, or detachable and self-adjusting shank is so constructed that when the anchor is to be used without the appliances of the scoop, or the sliding connection for the chain, or the stop for the sliding connection, or with or without the lateral extension of the shank and the mushroom-anchor, the chain may be fastened to a flattened ball, rigidly fixed on one end of the shank, so as to permit the slipping back of the entire shank to the crown of the anchor, and facilitate the disengagement of the flukes from the ground when weighing anchor; or, when, upon turn of the tide or from other cause, the vessel is carried over its anchor, and thereby the anchor is made loose from its hold, the socket-ball of the shank, when forced the length of the shank to the rear of the crown, will act as a veeringrudder, and slew the anchor round, in which event the socket-ball will be drawn again to its socket, and the flukes renew their hold upon the ground.

The crown projections or lips $d$ are so constructed that, in addition to adding strength to the crown and giving it elevation, so that the points of the flukes may be placed at an angle with the ground and speedily penetrate it, they also serve as a lever or tripper, and force the flukes to quickly do their work.

The ball-and-socket joint possesses simplicity, durability, and strength. It is simple of construction, not liable to get out of order, and, by always accommodating itself to circumstances of position, with certainty brings the flukes to their proper position. It is strong, by presenting a large bearing-surface in a small space, and utilizes friction when the anchor is doing its heaviest work.

The mushroom-head will relieve the strain upon the flukes, and also upon the shank, by distributing the pressure over a greater length of the shank, as well as take an additional hold upon the ground, thus enabling a lighter anchor to hold a vessel of lighter tonnage.

The mechanism for retaining the ball in the socket facilitates taking apart or unlimbering the anchor for stowage and handling, and is adjustable, and can be placed upon the shank without weakening it, or inserted through the crown. It also enables the maker to make the mushroom part and the ball for the socket in one solid piece with the shank, should it prove desirable to construct the anchor so as to prevent the sliding up of the flukes and crown on the shank, or vice versa.

The tube or slide, to which the chain is fastened, is to prevent the binding of the chain when pulled at an angle with the shank in the act of disengaging the anchor from the bottom, when the mechanism for retaining the head in the socket is used.

The stop for sliding connection is to be used when the ball is retained in the socket by ring or screw, and is to be so placed as to overbalance the anchor when the chain-slide is drawn back, in order that the anchor may with certainty swing round or roll over and renew its hold upon change of tide.

The scoop will serve the double purpose of scraping a foul bottom, in order that the flukes may have a firmer hold, as well relieve the strain upon the fluke-arms and shank at the point of contact of the latter with the crown-lip, and also increase the holding-power of the anchor. The scoop may be made adjustable, loose, or fast at any point along the shank, as experience may determine best for its purposes.

The fluke-arms being in one continuous piece with the metal at the crown, and the crown being divided in the rear center, and its edges rolled outward and turned under, give an increased tendency to the flukes to penetrate the earth when the anchor is dragged, besides giving the required elevation to the crown and angle to the flukes, and assistance in holding-power.

Having thus described my invention, what I claim as new, and desire to secure by Letters Patent, is—

1. An anchor having its shank and fluke-arms constructed with a ball-and-socket joint, substantially as and for the purpose set forth.

2. The loose, free, or detachable and self-adjusting shank A, substantially as and for the purpose set forth.

3. The fluke-arms, in combination with the crown, having groove D and opening $b$, substantially as and for the purpose set forth.

4. The mushroom-head J, in combination with a fluke-anchor, substantially as and for the purpose set forth.

5. Mechanism E, for retaining the head in the socket, substantially as and for the purpose set forth.

6. A sliding connection between the shank and chain, substantially as and for the purpose set forth.

7. The sliding connection of the shank and chain, in combination with a stop therefor, substantially as and for the purpose set forth.

8. The scoop H, in combination with a fluke-anchor, substantially as and for the purpose set forth.

R. MILES ROBINSON.

Witnesses:
   JOHN A. WIEDERSHEIM,
   A. P. GRANT.